(12) United States Patent
Im

(10) Patent No.: US 7,522,378 B2
(45) Date of Patent: Apr. 21, 2009

(54) MAGNETIC HEAD FOR PERPENDICULAR MAGNETIC WRITING

(75) Inventor: Young-hun Im, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 415 days.

(21) Appl. No.: 11/014,688

(22) Filed: Dec. 20, 2004

(65) Prior Publication Data
US 2005/0135005 A1   Jun. 23, 2005

(30) Foreign Application Priority Data
Dec. 19, 2003   (KR) .................... 10-2003-0093686

(51) Int. Cl.
*G11B 5/127*   (2006.01)
*G11B 5/147*   (2006.01)
(52) U.S. Cl. ............................ 360/125.12; 360/125.04
(58) Field of Classification Search ................ 360/125, 360/126, 127, 128, 125.04, 125.07, 125.12, 360/125.02, 125.03, 125.15
See application file for complete search history.

(56) References Cited

U.S. PATENT DOCUMENTS

| | | | |
|---|---|---|---|
| 4,814,921 A * | 3/1989 | Hamakawa et al. ...... 360/125.5 |
| 6,473,265 B1 * | 10/2002 | Zhou et al. ............. 360/125.53 |
| 6,490,126 B1 * | 12/2002 | Sasaki ........................ 360/126 |
| 6,778,358 B1 * | 8/2004 | Jiang et al. ................ 360/125.5 |
| 6,791,796 B2 * | 9/2004 | Shukh et al. ................. 360/126 |
| 6,816,339 B1 * | 11/2004 | Litvinov et al. ......... 360/125.22 |
| 2003/0189787 A1 * | 10/2003 | Matono et al. .............. 360/126 |
| 2003/0193742 A1 * | 10/2003 | Matono et al. .............. 360/126 |

FOREIGN PATENT DOCUMENTS

| | | |
|---|---|---|
| JP | 55-12522 A | 1/1980 |
| JP | 62-046414 A | 2/1987 |
| JP | 10-255227 A | 9/1998 |
| JP | 2002-92820 A | 3/2002 |

* cited by examiner

*Primary Examiner*—William J Klimowicz
(74) *Attorney, Agent, or Firm*—Sughrue Mion, PLLC

(57) ABSTRACT

Provided is a magnetic head including a perpendicular magnetic head to write information by a perpendicular magnetic writing method. The perpendicular magnetic head has a return pole, a writing pole having a predetermined distance from the return pole and including a first pole portion and a second pole portion that are separated from each other and a connection pole portion connecting the first and second pole portions, and an induction writing coil inducing the formation of a magnetic field on the writing pole. According to the provided perpendicular magnetic head, the effect of eddy current is reduced by improving the structure of the writing pole, thus the intensity of a magnetic field obtained in a high frequency band is similar to the intensity of a magnetic field obtained in a low frequency band and a large field gradient is obtained.

13 Claims, 9 Drawing Sheets

MAGNETIC HEAD FOR PERPENDICULAR MAGNETIC WRITING

BACKGROUND OF THE INVENTION

This application claims the priority of Korean Patent Application No. 2003-93686, filed on Dec. 19, 2003, in the Korean Intellectual Property Office, the disclosure of which is incorporated herein in its entirety by reference.

FIELD OF THE INVENTION

The present invention relates to a magnetic head and, more particularly, to a magnetic head for perpendicular magnetic writing.

DESCRIPTION OF THE RELATED ART

In the field of hard disk drives (HDD) as a representative magnetic information storage medium, there is little margin for improving a recording density by a longitudinal magnetic recording method. Thus, studies of a perpendicular magnetic recording method are being actively performed to improve a recording density. The recording density of an HDD in a longitudinal magnetic recording type is about 170 Gb/in$^2$. It is expected that the recording density of an HDD in a perpendicular magnetic recording type will be increased to over 500 Gb/in$^2$.

The perpendicular magnetic recording method arranges the magnetization direction of a head in a perpendicular direction to increase a recording density. In general, a perpendicular magnetic head applies a perpendicular magnetic field to a recording medium by using a writing pole of a single pole type. When such a head is used, a perpendicular magnetic recording medium of a double magnetic layer type, which is formed of a soft under layer and a magnetic recording layer stacked on a substrate, is used as a recording medium.

FIG. 1 is a view illustrating a conventional perpendicular magnetic head.

Referring to FIG. 1, a conventional perpendicular magnetic head includes a writing pole 1 for forming a magnetic flux toward a recording medium, a return pole 3 for flowing the magnetic flux from the writing pole 1 through a recording medium, and an induction writing coil 5 for forming a magnetic field on the writing pole 1.

In the conventional perpendicular magnetic head, the writing pole i is formed in a single pole type. The return pole 3 is separated from the writing pole 1 by a predetermined distance.

A high recording density is obtained by a magnetic field in a perpendicular direction, which is generated from the writing pole 1 due to the interaction with the soft under layer of the recording medium. When writing information by using the writing pole 1, the magnetic field from the writing pole 1 flows to the return pole 3 through the recording medium. Such a perpendicular magnetic writing can realize a high linear recording density on a recording medium.

However, in a high frequency band, the magnetic flux flowing on the writing pole 1 is not uniformly distributed to the inside and the surface of the writing pole 1, but is distributed to the surface of the writing pole 1 only due to the effect of eddy current, as shown in FIG. 2. Thus, a magnetic field in the high frequency band is remarkably reduced with respect to the magnetic field in a low frequency band which occurs on a recording medium, as shown in FIG. 12, which will be described later. In addition, a field gradient is also reduced due to the decrease in the intensity of the magnetic field in the high frequency band, as shown in FIG. 13, which will be described later. The effect of eddy current may be increased according to the conductivity and the frequency of the writing pole 1.

The eddy current generates heat on a magnetic layer having conductivity due to an electric resistance, resulting in an eddy current loss. The magnetic field of the writing pole 1 is quickly changed due to an alternating magnetic field, thus the heat by the eddy current is generated. Accordingly, the performance of a perpendicular magnetic writing is deteriorated. Furthermore, the heat generated from the writing pole 1 affects the saturation of a magnetic field, thus the intensity of the magnetic field is reduced in a writing operation. In addition, the change of the magnetic field by currents cannot be smoothly induced.

SUMMARY OF THE INVENTION

The present invention provides a magnetic head for perpendicular magnetic writing by improving the structure of a writing pole to reduce the effect of eddy current.

According to an aspect of the present invention, there is provided a magnetic head including a perpendicular magnetic head to write information by a perpendicular magnetic writing method, wherein the perpendicular magnetic head comprises a return pole, a writing pole having a predetermined distance from the return pole, and including a first pole portion and a second pole portion that are separated from each other and a connection pole portion connecting the first and second pole portions, and an induction writing coil inducing the formation of a magnetic field on the writing pole.

The connection pole portion may be formed in any one of Y-shape, T-shape, [-shape, and ]-shape.

The magnetic head may further comprise a magnetic material between the first and second pole portions and an insulating material between at least one of the first and the second pole portions and the magnetic material.

The first and second pole portions may have a larger or smaller saturation magnetization density than the magnetic material.

The width of a leading edge of the return pole may be the same or larger than the width of the central portion of the return pole.

An insulating material may be formed between the first and second pole portions, instead of the magnetic material

BRIEF DESCRIPTION OF THE DRAWINGS

The above and other objects, features and advantages of the present invention will become more apparent by describing in detail exemplary embodiments thereof with reference to the attached drawings, in which.

1 and the intensity of magnetic fields generated in a low frequency band and a high frequency band by a perpendicular magnetic head according to an exemplary embodiment of the present invention that represents the magnetic flux distribution of FIG. 11.

DETAILED DESCRIPTION OF THE ILLUSTRATIVE NON-LIMITING EMBODIMENTS

Exemplary embodiments of the invention will now be described below by reference to the attached Figures. The described exemplary embodiments are intended to assist the understanding of the invention, and are not intended to limit the scope of the invention in any way.

Figure 3:
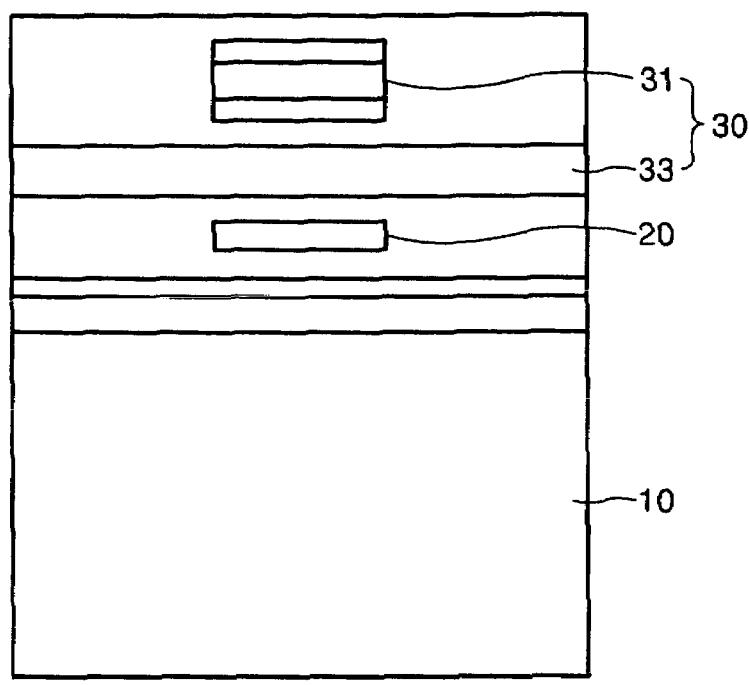
FIG. 3 illustrates a magnetic head according to an exemplary embodiment of the present invention.

FIG. 3 illustrates a magnetic head according to an exemplary embodiment of the present invention. Referring to FIG. 3, a magnetic head includes a perpendicular magnetic head 30 formed on a substrate 10 in a stacking structure. In addition, the magnetic head includes a reading head 20 at one side of the perpendicular magnetic head 30.

In the magnetic head, the reading head 20 is formed on the substrate 10, a return pole 33 formed of a magnetic material is formed on the reading head 20, and a writing pole 31 is formed on the return pole 33.

A magnetic head according to an exemplary embodiment of the present invention may include various magnetic resistant heads as the reading head 20.

A characteristic of the magnetic head according to an exemplary embodiment of the present invention is the perpendicular magnetic head 30, which minimizes the effect of eddy current in a high frequency band. Thus, various exemplary embodiments of the perpendicular magnetic head according to the present invention that can be used as the perpendicular magnetic head 30 will now be described. The same reference numerals are used for the same elements throughout, and the descriptions thereof will be omitted in the descriptions of FIGS. 4 through 10.

Figure 4:
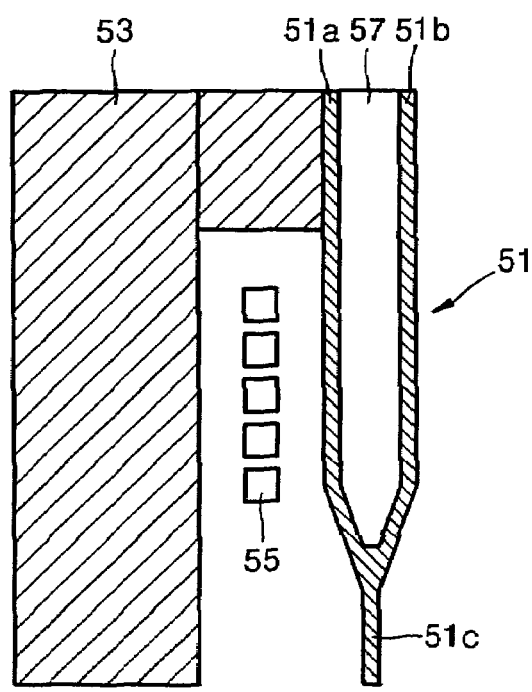
FIGS. 4 through 10 are perpendicular magnetic heads according to exemplary embodiments of the present invention that may be applied to the magnetic head of FIG. 3.

Referring to FIG. 4, a perpendicular magnetic head according to an exemplary embodiment of the present invention includes a return pole 53, a writing pole 51, which is separated from the return pole 53 by a predetermined distance to form a leakage magnetic flux toward a recording medium, and an induction writing coil 55, which induces the formation of a magnetic field on the writing pole 51.

The magnetic flux from the writing pole 51 flows through the return pole 53 and to the recording medium.

The writing pole 51 includes first and second pole portions 51a and 51b, which are separated from each other, and a connection pole portion 51c, which connects the first and second pole portions 51a and 51b. In addition, the writing pole 51 may further include a magnetic material member between the first and second pole portions 51a and 51b, in other words, an intermediate magnetic layer 57.

The first and second pole portions 51a and 51b are formed of a magnetic material. Preferably, but not necessarily, the first and second pole portions 51a and 51b are formed of a magnetic material having different saturation magnetizations than the intermediate magnetic layer 57. More preferably, but not necessarily, the first and second pole portions 51a and 51b may be formed of a magnetic material having a larger saturation magnetization than the intermediate magnetic layer 57. In this case, the intermediate magnetic layer 57 exists at the writing pole 51 of the perpendicular magnetic head, materials having a high magnetic flux density that correspond to the first and second pole portions 51a and 51b exist on and under the intermediate magnetic layer 57, and the material having a high magnetic flux density is united at a portion near a recording medium into one material having a high magnetic flux density that corresponds to a connection pole portion 51c.

In other cases, the first and second pole portions 51a and 51b may be formed of a magnetic material having a smaller saturation magnetization than the intermediate magnetic layer 57.

The first and second pole portions 51a and 51b are formed of a material different from the intermediate magnetic layer 57, thus insulation effects occur at the boundaries between the first pole portion 51a and the intermediate magnetic layer 57 and between the second pole portion 51b and the intermediate magnetic layer 57.

Accordingly, the perpendicular magnetic head of FIG. 4 can repress the generation of eddy current by the laminating effect of magnetic layers.

Figure 5:
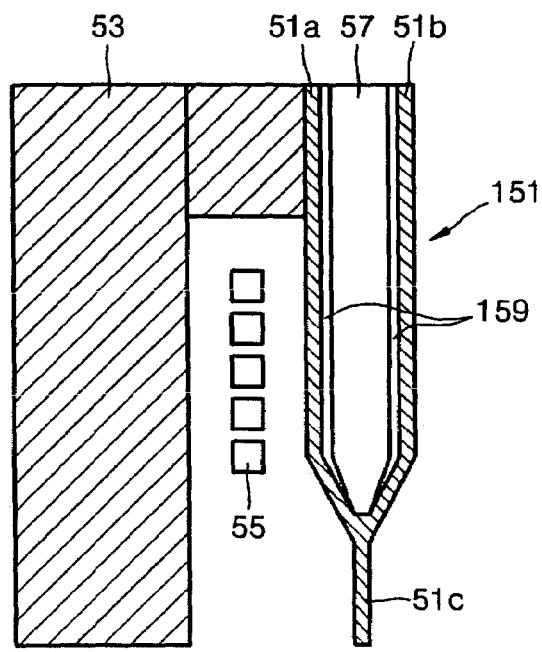

In order to repress further the generation of eddy current by adding an insulating material, a writing pole 151 of a perpendicular magnetic head according to an exemplary embodiment of the present invention may further comprise an insulating material member, in other words, insulating layers 159 between a first pole portion 51a and an intermediate magnetic layer 57 and between a second pole portion 51b and the intermediate magnetic layer 57, as shown in FIG. 5. Here, the insulating layers 159 are formed to a small thickness, for example, 100 nm or less. The insulating layer 159 may be formed at any one portion between the first pole portion 51a and the intermediate magnetic layer 57 or between the second pole portion 51b and the intermediate magnetic layer 57.

Figure 6:
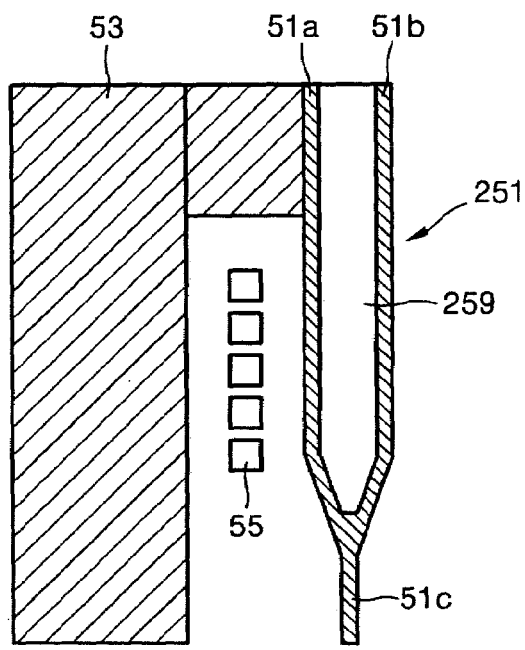

A writing pole 251 of a perpendicular magnetic head according to an exemplary embodiment of the present invention may include an insulating layer 259 only, instead of an intermediate magnetic layer between a first pole portion 51a and a second pole portion 51b, as shown in FIG. 6. Since a magnetic field is mainly distributed to both surfaces of the first and second pole portions 51a and 51b in a high frequency band, it is possible to form the insulating layer 259 instead of the intermediate magnetic layer. In this case, the insulating layer 259 efficiently represses the generation of eddy current.

The insulating layers 159 and 259 are formed of a non-magnetic material, for example, $Al_2O_3$ or $SiO_2$.

On the other hand, the connection pole portion 51c of FIGS. 4 through 6 may be formed of the same magnetic material as the first and second pole portions 51a and 51b.

The connection pole portion 51c may be formed in a Y-shape as shown in FIGS. 4 through 6.

Figure 7:
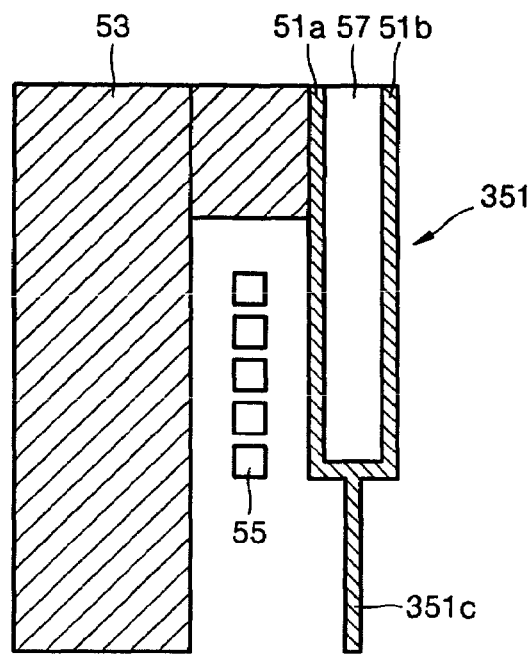
Figure 8:
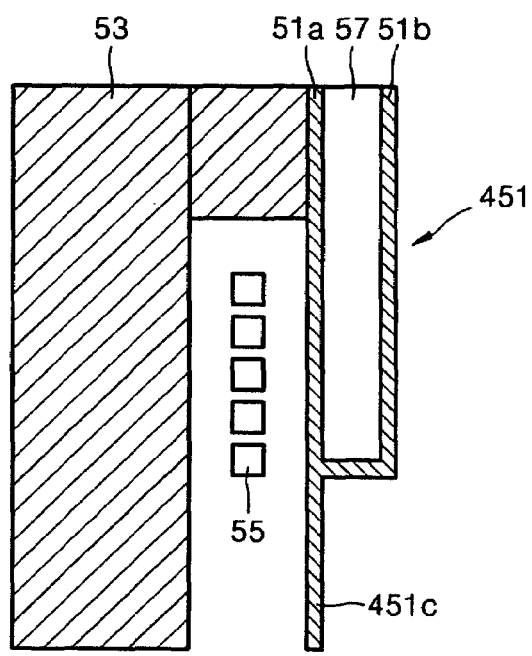
Figure 9:
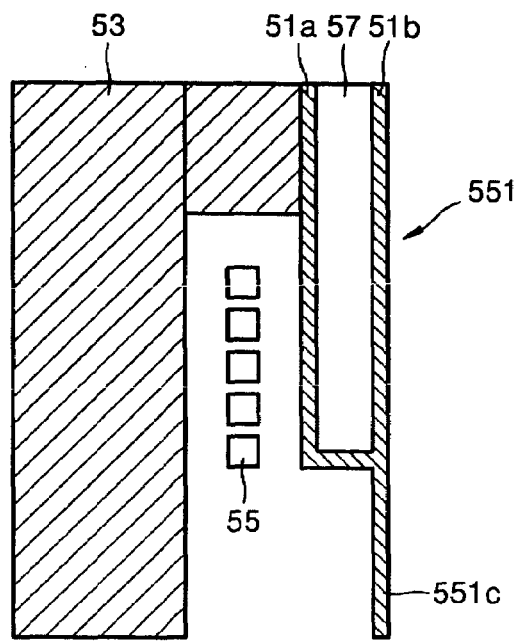

In other cases, a writing pole 351, 451, or 551 of a perpendicular magnetic head according to the present invention may include a connection pole portion 351c, 451c, or 551c in a T-shape, a ⌈-shape, or a ⌉-shape as shown in FIGS. 7 through 9, instead of the connection pole portion 51c of Y-shape. Here, the expression that the connection pole portions 451c and 551c have ⌈-shape and ⌉-shape must be considered as including a ⌞-shape and a ⌟-shape under consideration the portions of the connection pole portions 451c and 551c connecting to the first and second pole portions 51a and 52b.

In FIG. 8, a second pole portion 51b is connected to the extending portion of a first pole portion 51a by using a part of the connection pole portion 451c which is perpendicular to the extending portion; however, a magnetic head is manufactured by stacking and etching processes, thus the connecting portion may be inclined. In addition, a portion of the connection pole portion 551c for connecting a first pole portion 51a to the extending portion of a second pole portion 51b is perpendicular to the extending portion, in FIG. 9. However, a magnetic head is manufactured by stacking and etching processes, thus the connecting portion may be inclined.

Accordingly, the connection pole portions 451c and 551c in ⌈-shape and ⌉-shape do not mean that the connecting portions are perpendicular to the extending portions of the first and second pole portions 51a and 51b or that they form a predetermined angle, but mean that any one of the first and second pole portions 51a and 51b is connected to the extending portion of the other pole portion.

The layer structures of the perpendicular magnetic heads of FIGS. 7 through 9 are the same as the perpendicular magnetic head of FIG. 4, but the shapes of the connection pole portions are different. The connection pole portions 351c, 451c, and 551c in T-shape, ⌈-shape, and ⌉-shape shown in FIGS. 7 through 9 can be applied to the perpendicular magnetic heads of FIGS. 5 and 6.

Figure 10:
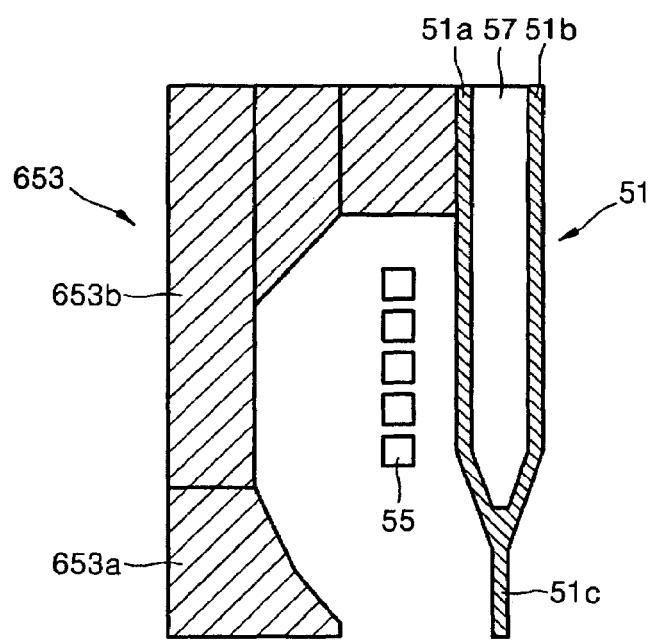

On the other hand, the width of leading edges of return poles 53 of FIGS. 4 through 9 is the same as the width of central portions of the return poles 53 of FIGS. 4 through 9. A perpendicular magnetic head according to an exemplary embodiment of the present invention may include a return pole 653 having a leading edge 653a, which faces a recording medium, with a larger width than the width of a central portion 653b, as shown in FIG. 10. In this case, a magnetic field distribution area can be increased at the leading edge 653a of the return pole 653, thus the intensity of the magnetic field at the return pole 653 can be reduced.

The structure of the perpendicular magnetic head of FIG. 10 is the same as that of FIG. 4, except for the return pole 653. In other cases, a perpendicular magnetic head according to an exemplary embodiment of the present invention may include the return pole 653 of FIG. 10, any one of the connection pole portions 351c, 451c, and 551c of FIGS. 7 through 9, and the layers of FIG. 4.

In addition, a perpendicular magnetic head according to an exemplary embodiment of the present invention may include the return pole 653 of FIG. 10, any one of the connection pole portions 51c, 351c, 451c, and 551c of FIG. 4 and FIGS. 7 through 9, and any one of the layers of FIGS. 5 and 6.

Various examples of the perpendicular magnetic head according to the present invention can be analogized from the perpendicular magnetic heads of FIGS. 4 through 10, thus the descriptions of various examples are omitted.

According to the perpendicular magnetic head consistent with the present invention, a high recording density is obtained by a strong perpendicular magnetic field generated from a writing pole, due to the interaction with a soft under layer of a recording medium. When writing information by using the writing pole, the magnetic field generated from the writing pole flows to a return pole through the recording medium. Thus, the perpendicular magnetic head according to the present invention can realize a high linear recording density on the recording medium in a high frequency band.

In addition, the perpendicular magnetic head according to the present invention reduces the effect of eddy current in a high frequency band, thus the strength of a magnetic field applied to a recording medium can be increased.

Figure 11:
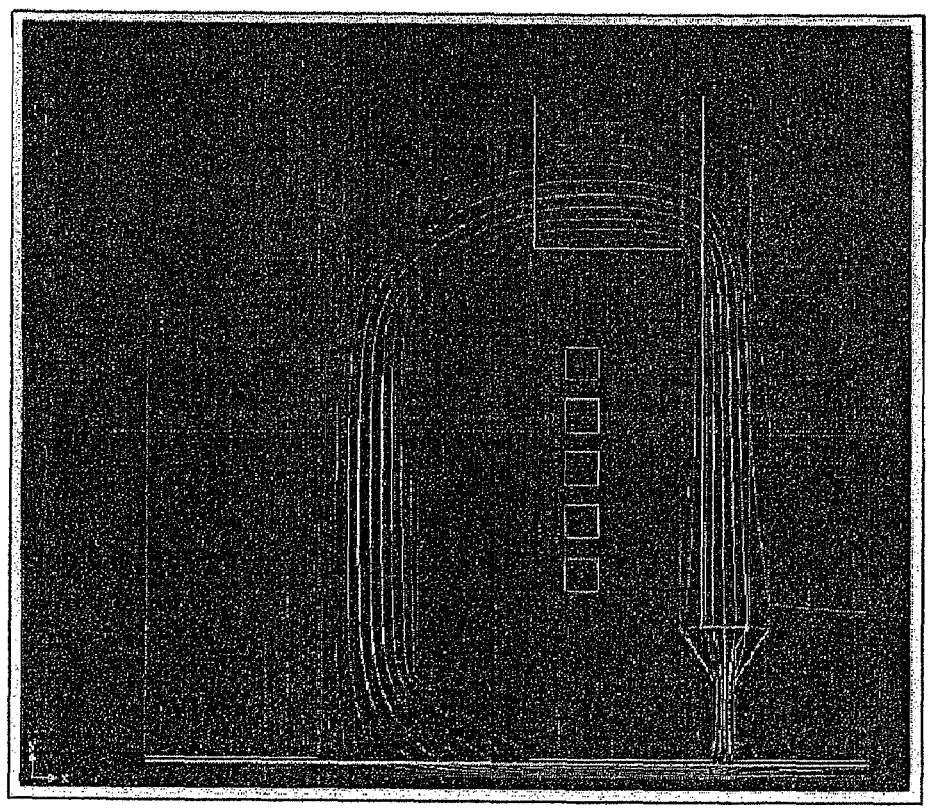
FIG. 11 illustrates the distribution of a magnetic field in a perpendicular magnetic head according to an exemplary embodiment of the present invention.

FIG. 11 illustrates the distributions of magnetic fields on a perpendicular magnetic head according to an exemplary embodiment of the present invention. FIG. 11 illustrates the flow of a magnetic flux, which is calculated through a magnetic field by eddy current, at a frequency of 200 MHz by using the perpendicular magnetic head of FIG. 10.

Figure 2:
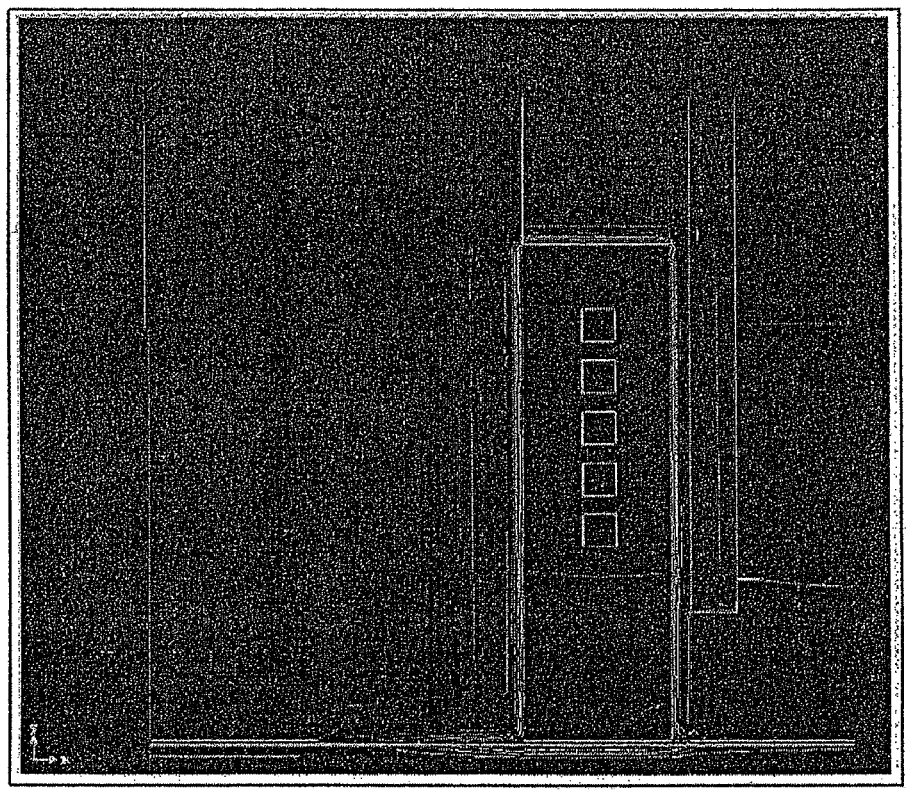
FIG. 2 illustrates the distribution of a magnetic field in a conventional perpendicular magnetic head.

In the case of a conventional perpendicular magnetic head, a magnetic flux is mainly distributed on the surface of a writing pole due to the effect of eddy current, as shown in FIG. 2. However, in the case of the perpendicular magnetic head according to an exemplary embodiment of the present invention, the effect of eddy current in a high frequency band is reduced, thus the magnetic flux is evenly distributed in and on a writing pole.

Figure 1:
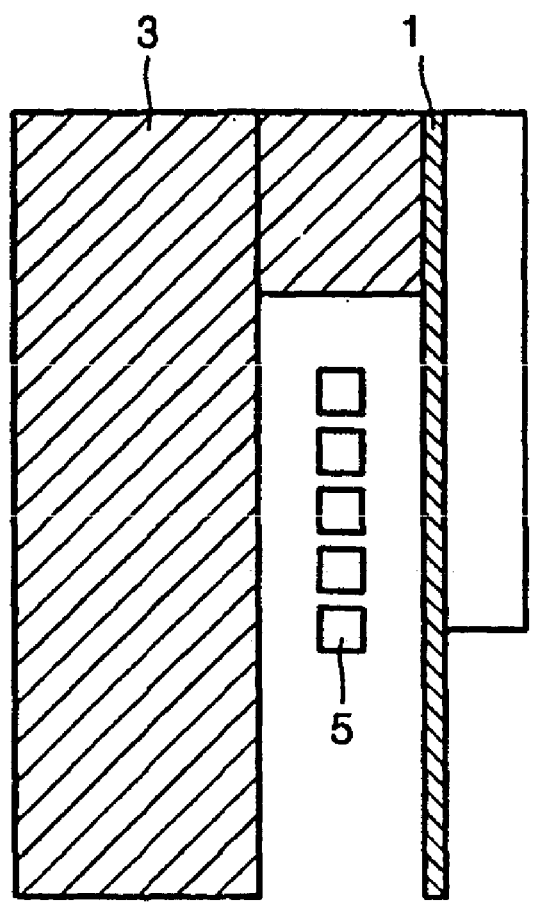
FIG. 1 illustrates a conventional perpendicular magnetic head.
Figure 12:
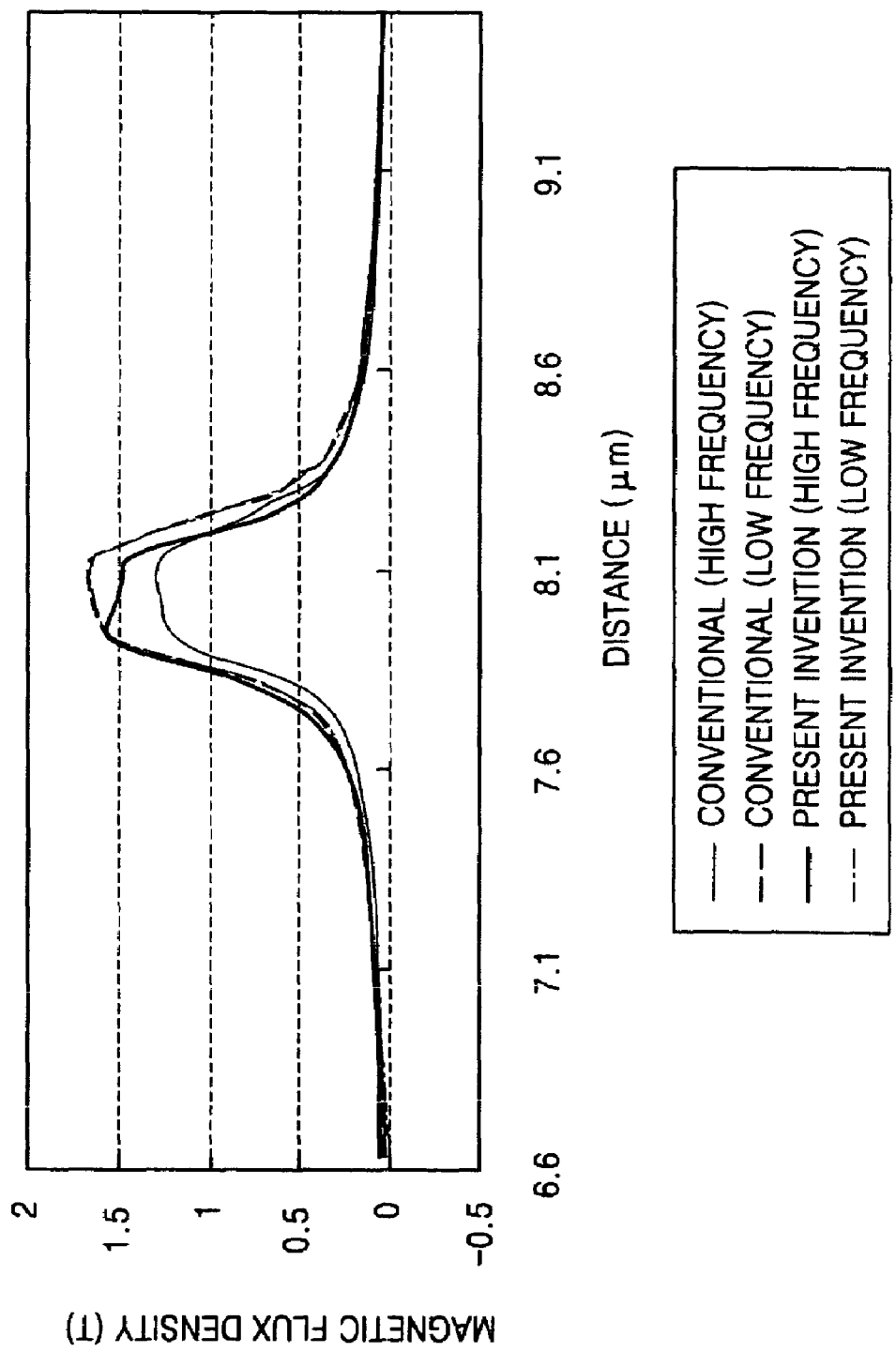
FIG. 12 is a graph illustrating the intensity of magnetic fields generated in a low frequency band and a high frequency band by a conventional perpendicular magnetic head of FIG.

FIG. 12 is a graph illustrating the intensity of magnetic fields generated in a low frequency band and a high frequency band by a conventional perpendicular magnetic head shown in FIG. 1 and the intensity of magnetic fields generated in the low frequency band and the high frequency band by a perpendicular magnetic head according to an exemplary embodiment of the present invention that represents the magnetic flux distribution of FIG. 11.

The X-axis of the graph of FIG. 12 denotes a distance from a center of a pole, which writes information in a down track direction (dimension: μm), and the Y-axis denotes a magnetic flux density (dimension: T).

In the graph of FIG. 12, a magnetic field distribution with respect to a low frequency band is obtained at 0 Hz, in other words, in a magnetostatic state. A magnetic field distribution with respect to a high frequency band is obtained at the high frequency state of 200 MHz by the effect of eddy current.

As shown in the graph of FIG. 12, when a conventional perpendicular magnetic head is used, the intensity of a magnetic field in the high frequency band is remarkably reduced compared to a magnetic field obtained in a magnetostatic state due to the effect of eddy current. However, when a perpendicular magnetic head according to an exemplary embodiment of the present invention is used, the intensity of a magnetic field in the high frequency band is similar to the intensity of a magnetic field obtained in the magnetostatic state.

Figure 13:
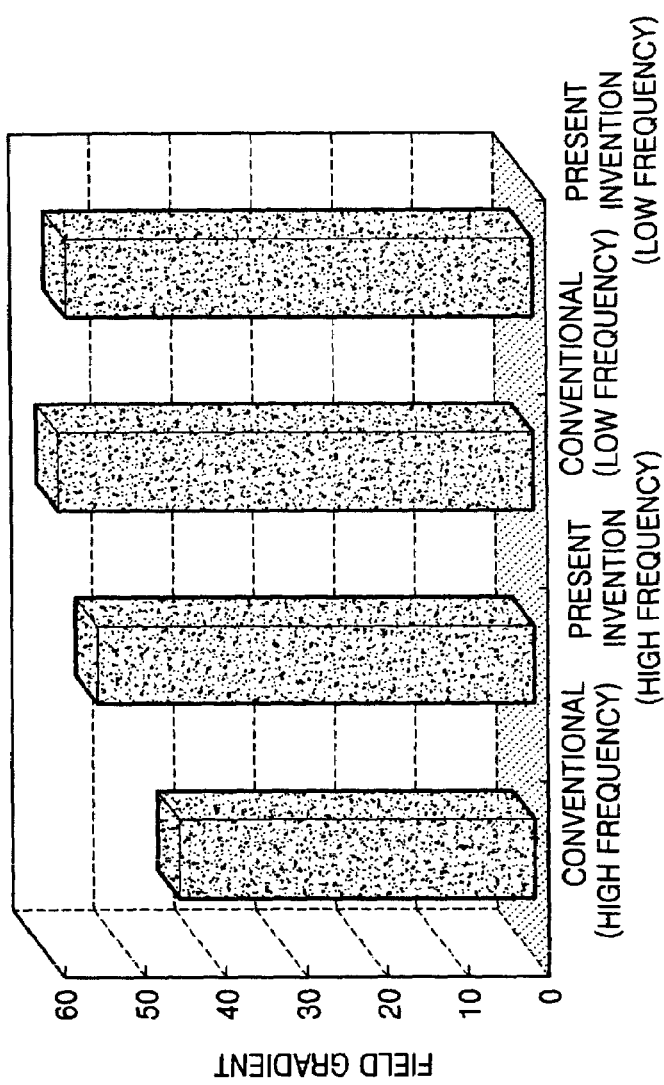
FIG. 13 is a graph illustrating the field gradients of magnetic flux densities by a conventional perpendicular magnetic head and a perpendicular magnetic head according to an exemplary embodiment of the present invention.

FIG. 13 is a graph illustrating field gradients of magnetic flux densities by a conventional perpendicular magnetic head and a perpendicular magnetic head according to an exemplary embodiment of the present invention.

Referring to the graph of FIG. 13, at a coercivity between 4,000 to 7,000 Oe, the field gradients by the conventional perpendicular magnetic head and the perpendicular magnetic head according to an exemplary embodiment of the present invention are similar in a low frequency band. However, the field gradient by the perpendicular magnetic head according to an exemplary embodiment of the present invention is larger than the field gradient by the conventional perpendicular magnetic head, in a high frequency band. In other words, the perpendicular magnetic head according to an exemplary embodiment of the present invention does not remarkably reduce the intensity of the magnetic field by the effect of the eddy current, thus the field gradient is improved.

According to a perpendicular magnetic head according to an exemplary embodiment of the present invention, the effect of eddy current is reduced by improving the structure of a writing pole, thus the intensity of a magnetic field obtained in a high frequency band is similar to the intensity of a magnetic field obtained in a low frequency band.

In addition, the perpendicular magnetic head according to an exemplary embodiment of the present invention obtains a large field gradient by repressing the decrease in the intensity of a magnetic field due to the effect of eddy current.

While the present invention has been particularly shown and described with reference to non-limiting exemplary embodiments thereof, it will be understood by those of ordinary skill in the art that various changes in form and details may be made therein without departing from the broad spirit and scope of the present invention as defined by the following claims.

What is claimed is:

1. A magnetic head including a perpendicular magnetic head to write information by a perpendicular magnetic writing method, wherein the perpendicular magnetic head comprises:
   a return pole;
   a writing pole having a predetermined distance from the return pole, and including a first pole portion and a second pole portion that are separated from each other and a connection pole portion connecting the first and second pole portions;
   an induction writing coil which induces the formation of a magnetic field on the writing pole; and
   a magnetic material between the first and second pole portions,
   wherein the first and second pole portions have different saturation magnetization densities than the magnetic material.

2. The magnetic head of claim 1, wherein the connection pole portion is formed in any one of a Y-shape, T-shape, ⌈-shape, and ⌉-shape.

3. The magnetic head of claim 1 further comprising an insulating material between at least one of the first and the second pole portions and the magnetic material.

4. The magnetic head of claim 2 further comprising an insulating material between the first and second pole portions.

5. The magnetic head of claim 4, wherein the width of a leading edge of the return pole is the same or larger than the width of a central portion of the return pole.

6. The magnetic head of claim 4, wherein a width of a leading edge of the return pole is the same or larger than a width of a central portion of the return pole.

7. The magnetic head of claim 1 further comprising an insulating material between the first and second pole portions.

8. The magnetic head of claim 7, wherein a width of a leading edge of the return pole is the same or larger than a width of a central portion of the return pole.

9. The magnetic head of claim 1, wherein a width of a leading edge of the return pole is the same or larger than a width of a central portion of the return pole.

10. The magnetic head of claim 1, further comprising an insulating material between the first pole portion and the magnetic material and between the second pole portion and the magnetic material.

11. The magnetic head of claim 1, wherein the saturation magnetization densities of the first and second pole portions are larger than the saturation magnetization density of the magnetic material.

12. The magnetic head of claim 1, wherein the saturation magnetization densities of the first and second pole portions are smaller than the saturation magnetization density of the magnetic material.

13. A magnetic head including a perpendicular magnetic head to write information by a perpendicular magnetic writing method, wherein the perpendicular magnetic head comprises:
   a return pole;
   a writing pole having a predetermined distance from the return pole, and including a first pole portion and a second pole portion that are separated from each other and a connection pole portion connecting the first and second pole portions;
   an induction writing coil which induces the formation of a magnetic field on the writing pole; and
   a magnetic layer composed of a material different from that used in the first and second pole portions and disposed between the first and second pole portions.

* * * * *